United States Patent Office 3,780,166
Patented Dec. 18, 1973

3,780,166
PROCESS OF CATALYTICALLY REACTING $SO_2$ TO FORM $SO_3$ AND OF PRODUCING SULFURIC ACID
Herbert Drechsel, Frankfurt am Main, Karl-Heinz Dorr, Mainz (Rhine), and Hugo Grimm and Gustav Rowedder, Frankfurt am Main, Germany, assignors to Metallgesellschaft Aktiengesellschaft, Frankfurt am Main, Germany
Filed July 8, 1969, Ser. No. 839,823
Claims priority, application Germany July 11, 1968,
P 17 92 015.9
The portion of the term of the patent subsequent to Apr. 18, 1989, has been disclaimed
Int. Cl. C01b *17/76*
U.S. Cl. 423—522     8 Claims

ABSTRACT OF THE DISCLOSURE

A process of catalytically reacting $SO_2$-containing gas to form $SO_3$ in a catalytic plant including a plurality of catalyst stages and in which $SO_3$ is condensed between catalyst stages forming sulfuric acid, characterized in that:

(a) the $SO_3$-containing gas leaving the first of two successive stages is transferred along a closed flow path into the second of said two stages;

(b) a partial stream is separated from said transferred stream and cooled, and $SO_3$ is condensed from the partial stream;

(c) said partial stream following said condensing is combined with the balance of said transferred stream and and the combined stream is introduced into the second catalyst stage.

BACKGROUND

The invention relates to a process of catalytically reacting the $SO_2$ content of moist gases to form $SO_3$ in catalyst plants which comprise a plurality of catalyst trays and in which the resulting $SO_3$ content is condensed between the catalyst trays to form sulfuric acid.

In processes of catalytically reacting $SO_2$ to form $SO_3$ with formation of sulfuric acid, it is desired to achieve a high total conversion of $SO_2$ to form $SO_3$, which conversion depends on the respective conditions, and to achieve thermal self-sufficiency where gases from roasting are processed whereas in the processing of gases produced by the combustion of sulfur and, if possible, in the processing of gases from roasting, a surplus of utilizable heat is to be obtained which is as large as possible. These requirements are to be accomplished with means which are as economical as possible, e.g., with a small amount of catalyst and a low structural expenditure.

The conversion of $SO_2$ to form $SO_3$ can be increased if the resulting $SO_3$ is removed from the gases between individual catalyst trays.

Various processes of treating $SO_2$-containing dry gases are known, in which the $SO_3$ content of the gases is virtually completely removed in an intermediate absorber succeeding a catalyst stage, which may consist of various numbers of catalyst trays. The gases are then fed to the next catalyst stage and thereafter into the final absorber (printed German applications 1,136,988, 1,139,818, 1,177,117, 1,181,680, 1,186,838).

Compared to the catalytic processes using no interstage absorber, these processes have the advantage that they result in a higher total conversion of $SO_2$ to form $SO_3$ but still require interstage heat exchangers having considerable heat exchange surfaces. Interstage heat exchangers are heat exchangers in which the gas discharged from the interstage absorber is reheated to the operating temperature of the next catalyst tray.

Another process has been proposed in which an interstage absorption was to be effected after a plurality of catalyst stages. This process has not been successful in practice because the amount of extraneous heat to be supplied was so large that the process was uneconomical (German Pat. 479,680).

In connection with a process using catalyst-containing tubes, it has been proposed to branch off a partial stream of the $SO_3$-containing gases after the first catalyst stage and to cool it, then to subject said stream to interstage absorption and thereafter to admix it to the starting gas before it enters the first catalyst stage. This process has the disadvantage that the $SO_2$-content of the starting gas is reduced, the $SO_3$-containing gas is not cooled behind the first catalyst stage and before it enters the second catalyst stage, the second catalyst stage must be disposed within the first catalyst stage, and an exact, controlled temperature pattern cannot be obtained (German Pat. 749,145).

According to another proposal, a partial stream amounting to about 50% of the $SO_3$-containing gases is branched off after the first catalyst stage, which consists of a plurality of catalyst trays, another partial stream amounting to about 35% is branched off after the second catalyst stage, which consists also of a plurality of catalyst trays, and both partial streams are combined and fed to an interstage absorber, where the $SO_3$ content is completely absorbed. Gas at a rate corresponding to the partial streams which have been withdrawn is returned from the interstage absorber flow path to the catalyst flow path before each of the second and third catalyst stages. This process has the disadvantage that the partial streams which are withdrawn after the first and second catalyst stages and which have different $SO_2$ contents are mixed. When the gases are returned, a considerable amount of gas enters immediately the third stage rather than the second stage. This is probably the reason why a large number of catalyst trays are required. It is also difficult to match the rates at which gases are withdrawn from and returned to the cycle. An interstage blower is required in the process so that there is a danger of condensation, and interstage heat exchangers are required in any case (U.S. Pat. 1,789,460).

Various processes are known in which $SO_2$-containing, moist gases are catalytically reacted to form $SO_3$ in catalyst-containing vessels, the resulting $SO_3$-content together with steam is condensed with formation of sulfuric acid after a first catalyst stage and the remaining $SO_2$ is reacted to form $SO_3$ in a second catalyst stage and is subsequently absorbed.

The British patent specification 475,120 described such process in which the first catalyst stage is fed with moist gases, the resulting $SO_3$ and steam are subsequently condensed, the residual dry gas is reacted once more in a second catalyst stage and the resulting $SO_3$ is absorbed by sulfuric acid.

The U.S. patent specification 2,471,072 describes a similar process, in which the condensation is preceded by an absorption by sulfuric acid in a concentration up to 93%. The gases are cooled below 165° C. during the absorption. The resulting mixture of steam, $SO_2$ and sulfuric acid mist is cooled in a condenser to 30–45° C., whereby sulfuric acid in a concentration of 4–6% is produced. The cooled gas flows through a filter and a drying tower into the second catalyst stage.

This process produces only weak sulfuric acid and even rejects the sulfuric acid having a concentration of 4–6%.

Both processes have mainly the disadvantage that the gases must be dried after the condensing step and must be heated to the initiation temperature of the second catalyst stage.

THE INVENTION

It is an object of the invention to reduce the capital expenditure and operating costs involved in the removal of the $SO_3$ content of the gases between the individual catalyst trays in dependence on the desired total conversion of $SO_2$ to form $SO_3$ and to eliminate the need for interstage heat absorbers or to use only very small interstage heat absorbers.

This object is accomplished according to the invention in that the $SO_3$-containing gas leaving the first catalyst tray or the first few catalyst trays is transferred along a closed flow path into the next catalyst tray, part of the gas being transferred, herein called the "partial stream," is cooled and subsequently supplied to an interstage condenser and before entering the second catalyst stage is mixed with the remaining gas being transferred, and the gas volume of the partial stream is so controlled that the heat content of the partial stream after the interstage condensation plus the heat content of the gas being transferred which has not been subjected to condensation result in a mixed gas at a temperature which corresponds to the operating temperature required in the second catalyst tray.

The volume of the partial stream supplied to the interstage condenser will depend on the $SO_2$ content and the $SO_2/O_2$ ratio of the starting gases, the desired total conversion of $SO_2$ to form $SO_3$, the operating temperature of the catalyst and the operating temperature of the interstage condenser. For a constant total conversion, the volume of the partial stream must be increased in case of an increase in the $SO_2$ content and/or a drop in the operating temperature of the interstage condenser. The volume can be reduced if the total conversion is to be reduced. The volume of the partial stream amounts preferably to about 40–70% of the gases being transferred.

If a total conversion of about 98–98.5% is required, it is sufficient to provide one interstage condenser, which suitably succeeds the first catalyst tray.

If a total conversion in excess of about 98.5% is required, the $SO_3$-containing gas leaving the second or additional catalyst trays is also transferred in a closed flow path into the next catalyst tray, a partial stream of this gas being transferred is cooled and then subjected to interstage condensation and mixed with the remaining gas being transferred before entering the next catalyst tray, and the gas volume of the partial stream is controlled so that the heat content of the partial stream after the interstage condensation and the heat content of the gas being transferred which has not been subjected to condensation result in a mixed gas at a temperature which corresponds to the operating temperature required in the next catalyst tray.

The control of the volume of the partial stream which is supplied to the interstage condenser is determined by the same consideration as after the first catalyst tray. The volume amounts preferably to 20–50% of the volume of the gases being transferred.

The interstage condensers are preferably operated at a temperature of about 180–240° C.

The condensers may be of known design. It is preferable to use condensers in which the surfaces contacting the condensation are protected by or consist of acid-resisting material, such as glass, enameled material, highly fluorinated polyethylene, e.g., Teflon, or another acid-resisting material.

The cooling may be effected with the aid of liquid fluids with simultaneous recovery of steam and heating of water, e.g., for use as boiler feed water.

Alternatively, gaseous cooling fluids, preferably air, may be used. The heated gaseous fluid may be used as a heating medium.

The quantity of water which is required to condense the $SO_3$ content with recovery of sulfuric acid is added, preferably in the form of steam, to the $SO_2$-containing starting gas if the same has an insufficient water content.

The $SO_2$-containing starting gas can be moist. The air used need not be dried.

After the interstage condensers, the water content of the gases can be adjusted to the desired value.

The concentration of the sulfuric acid which has been condensed is about 94–98%.

The process according to the invention can be carried out with three catalyst trays, in which commercially available catalysts are employed.

If very high total conversions in excess of about 99.4% are required, an interstage heat exchanger is interconnected which has a small heat exchange surface. In this case, the mode of operation is such that the $SO_3$-containing gases leaving the first catalyst tray are treated as has been described hereinbefore and the $SO_3$-containing gas leaving the second catalyst tray is transferred in a closed flow path into the third catalyst tray, a partial stream of this gas being transferred is cooled, subsequently subjected to interstage condensation, and thereafter heated in an interstage heat exchanger and mixed with the remaining gas being transferred before entering the third catalyst tray, and the combined gases being transferred are supplied in the interstage heat exchanger with the heat quantity required to heat them to the operating temperature required in the third catalyst tray. The volume of the partial streams will depend on the above-mentioned factors. The volume of the partial stream after the second catalyst tray is preferably up to 90% of the volume of the gas being transferred.

The process may be carried out in such a manner that the volume of the partial stream after the first catalyst tray is up to 90% of the volume of the gas being transferred. Then the partial stream subjected to condensation is reheated in an interstage heat exchanger, to make up for the deficiency of heat resulting from withdrawing a large proportion of the transferred stream as the partial stream. The $SO_3$-containing gas leaving the second catalyst tray is transferred in a closed flow path to the third catalyst tray, a partial stream of this gas being transferred is cooled, then subjected to interstage condensation and thereafter mixed with the remaining gas being transferred before entering the third catalyst tray. The gas volume of the partial stream is controlled so that the heat content of the partial stream which has been subjected to condensation plus the heat content of the gas being transferred which has not been subjected to condensation, result in a mixed gas at a temperature which corresponds to the operating temperature required in the third contacting tray. The volume of the partial stream after the second catalyst tray amounts preferably to 20–50% of the volume of the gas being transferred.

When the $SO_2$-containing gases which are employed are initially cold, they will be heated to the operating temperature of the first catalyst tray before entering the same.

In a preferred embodiment of the process according to the invention, a pressure which is higher than that of the gas is maintained on the cold side of condensers having surfaces formed by materials which cannot be completely gas-tightly connected to the carrying structure, such as tube plates, or which render such connection difficult. This measure will prevent an escape of gas into the coolant system and a corrosion in said system.

The process according to the invention has the advantage that interstage heat exchangers, in which the gas leaving the interstage absorbers is reheated to the operating temperature of the next catalyst tray, can be entirely eliminated or only small interstage heat exchange surface are needed if a very high total conversion of $SO_2$, to form $SO_3$ is required. Only three catalyst trays containing smaller amounts of catalysts are required.

The process according to the invention is also suitable for catalytic processes carried out under superatmospheric pressure.

The process according to the invention will be described more fully with reference to the drawings and in examples.

Figure 1:
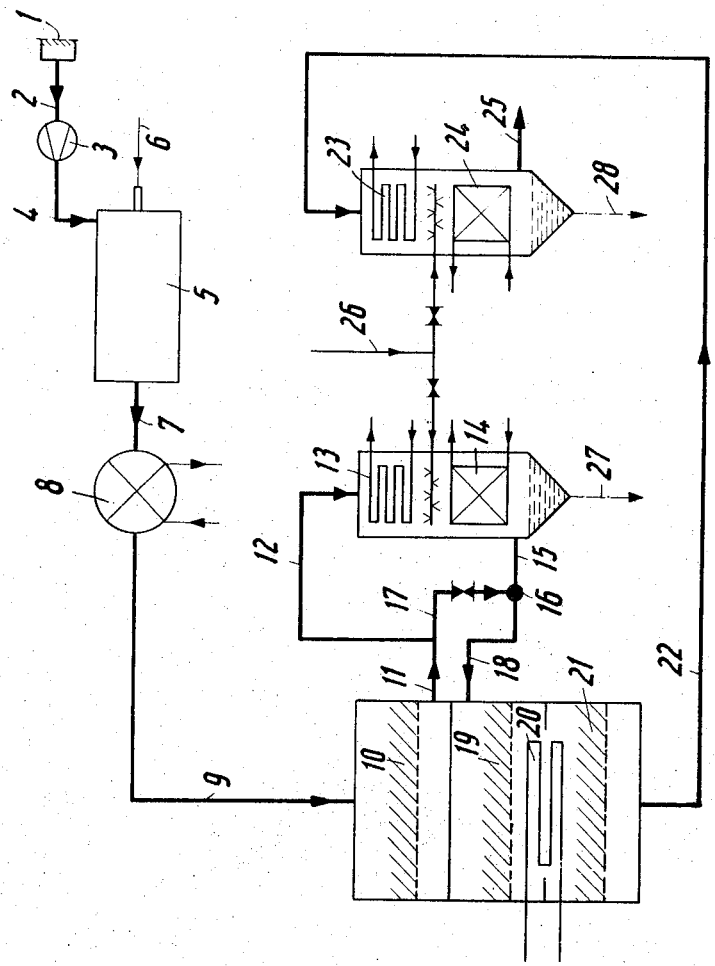
FIG. 1 shows a flow scheme relating to the processing of gases produced by the combustion of sulfur and resulting in a total conversion of about 98–98.5%.

Example 1 (FIG. 1)

Combustion air is supplied to the sulfur-burning furnace 5 through a dust filter 1, conduit 2, blower 3 and conduit 4. Liquid sulfur is injected from conduit 6 into furnace 5 and burned there. The gas containing 8–10% $SO_2$ is passed through conduit 7 into the waste heat boiler 8 and is cooled there to 430–450° C. and subsequently flows through conduit 9 into the first catalyst tray 10. All the gas, which has been partly reacted on the catalyst, is withdrawn from tray 10 through conduit 11. A partial stream is supplied through conduit 12 to the cooler 13, where it is cooled to a temperature above the dew point of the gas, passed into the condenser 14, cooled to about 180–240° C., and withdrawn from the condenser 14 and supplied to the mixing chamber 16 through conduit 15. The remaining hot gas, which has not been subjected to condensation, is directly supplied to the mixing chamber 16 through conduit 17. The ratio of the rate of the partial stream flowing through the condenser 12 to the rate of the remaining gas not subjected to condensation is so adjusted that the mixing results in the inlet temperature required for the next tray 19. The mixed gas is supplied through conduit 18 at a temperature of about 420–430° C. into the second catalyst tray 19. The gas which has been further reacted on the catalyst in the second tray 19 leaves the latter cooled in the heat exchanger 20 to the optimum inlet temperature of the third catalyst tray 21 before entering the latter. The gas which has been completely reacted on the catalyst is passed through conduit 22 into the cooler 23, where it is cooled to a temperature above the dew point of the gas and passed to the condenser 24, where the $SO_3$ contained in the gas is condensed. The exhaust gas is discharged through conduit 25. The water required for the condensation in the condensers 14 and 24 is supplied through conduit 26. The sulfuric acid which has been formed is withdrawn through conduits 27 and 28.

The acid concentration of the streams 27 and 28 averaged 97%. Through tubing 12, 6000 Nm.³/h. (60%) and through tubing 17, 4014 Nm.³/h. (40%) were conducted. These quantities are calculated to yield 100 tons monohydrate per day for a feed gas of 9% $SO_2$-content. The conversion of $SO_2$ to $SO_3$ in the first catalyst bed amounted to 72%. The gases were cooled in the coolers 13 and 23 to a temperature of 300 to 320° C.

The entering gas contained 157 kg. water per hour. Via tubing 26, 778 kg. steam were introduced; in the condenser 14, 340 kg. per hour were introduced and into condenser 24, 438 kg. per hour were introduced. In the condenser 24, the gas was cooled to approximately 160° C.

Figure 2:
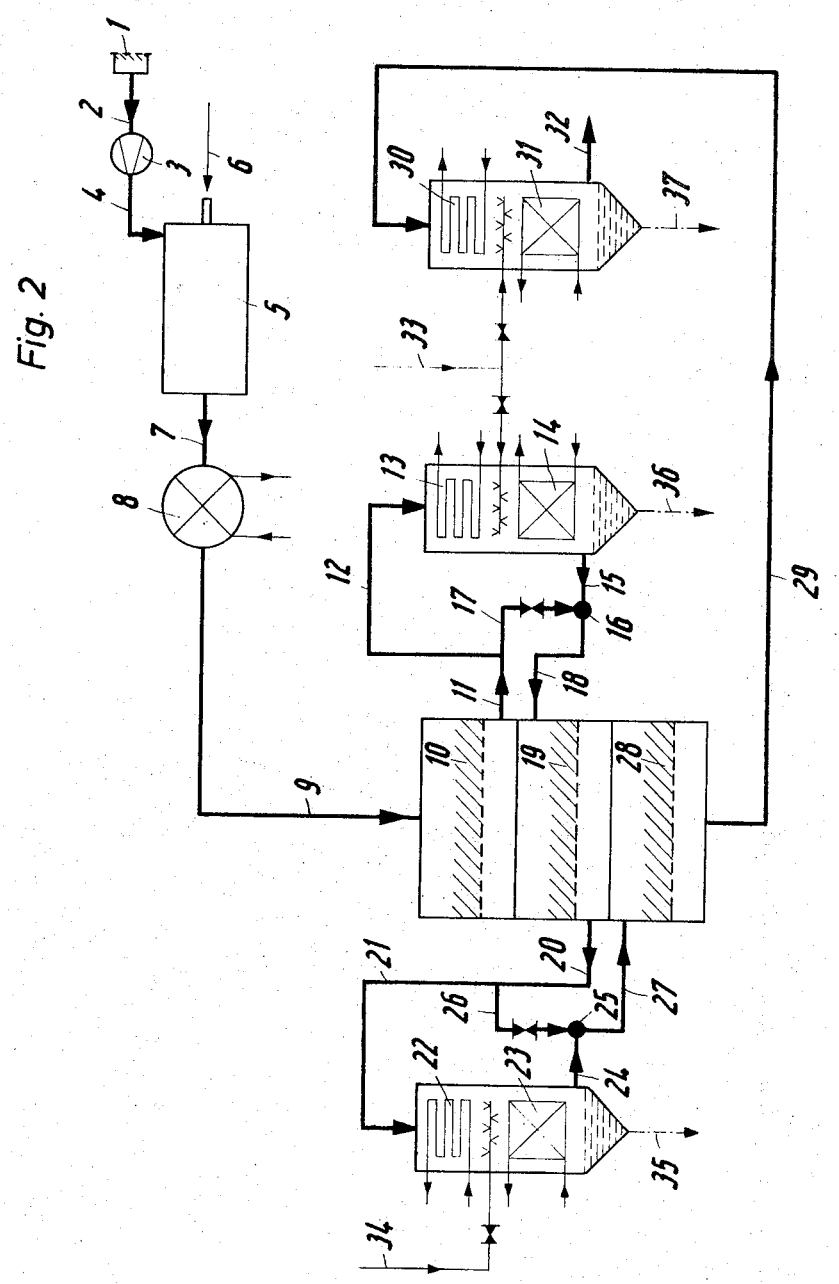
FIG. 2 is a flow scheme relating to the processing of gases produced by the combustion of sulfur and resulting in a total conversion of about 98.5–99.4%.

Example 2 (FIG. 2)

Combustion air is supplied to the sulfur-burning furnace 5 through a dust filter 1, conduit 2, blower 3 and conduit 4. Liquid sulfur is injected from conduit 6 into furnace 5 and burned there. The gas contained 8–10% $SO_2$ is passed through conduit 7 into the waste heat boiler 8 and is cooled there to 430–450° C. and subsequently flows through conduit 9 into the first catalyst tray 10. All gas which has been partly reacted on the catalyst is withdrawn from tray 10 through conduit 11. A partial stream is supplied through conduit 12 to the cooler 13, where it is cooled to a temperature above the dew point of the gas, passed into the condenser 14, cooled to about 180–240° C., and withdrawn from the condenser 14 and supplied to the mixing chamber 16 through conduit 15. The remaining hot gas, which has not been subjected to condensation, is directly supplied to the mixing chamber 16 through conduit 17. The ratio of the rate of the partial stream flowing through the condenser 14 to the rate of the remaining gas not subjected to condensation is so adjusted that the mixing results in the inlet temperature required for the next tray 19. The mixed gas is supplied through conduit 18 at a temperature of about 420–430° C. into the second catalyst tray 19. The gas which has been further reacted on the catalyst in the second tray 19 is withdrawn from the latter through conduit 20. A partial stream is passed through conduit 21 into the cooler 22, where it is cooled to a temperature above the dew point of the gas, then supplied into the condenser 23, cooled to about 180–240° C., and withdrawn from condenser 23 and supplied to the mixing chamber 25 through conduit 24. The remaining hot gas which has not been subjected to condensation is supplied through conduit 26 directly into the mixing chamber 25. The ratio of the rate of the partial stream passed through the condenser 23 and the rate of the remaining gas, which has not been subjected to condensation, is so adjusted that the inlet temperature required for the next tray 28 is obtained. The gas mixture which has been adjusted to the optimum inlet temperature is passed through conduit 27 into the catalyst tray 28. The gas which has been completely reacted on the catalyst is passed through conduit 29 into the cooler 30, where it is cooled to a temperature above the dew point of the gas and passed into the condenser 31, where the $SO_3$ contained in the gas is condensed. The exhaust gas is withdrawn through conduit 32. The water required for the condensation in the condensers 14, 31 and 23 is supplied through conduits 33 and 34, unless the starting gases contain sufficient moisture. Sulfuric acid is withdrawn through conduits 35, 36, and 37.

The average concentration of the acid in 35, 36 and 37 amounted to 97%. The amount of the gas in the tubings 12 and 17 was the same as in Example 1. The amount of gas in tubing 21 amounted to 5692 Nm.³/h. (60%) and the amount of gas in tubing 26 amounted to 3800 Nm.³/h. (40%). The conversion in this instance amounted to 97%. The gas was cooled in the coolers 13, 22 and 30 to a temperature of 300 to 320° C.

Through tubings 33 and 34, 778 kg. steam per hour were conducted. The portions were as follows: in condenser 14=340 kg. per hour; in condenser 23=168 kg. per hour; in condenser 31—270 kg. per hour. In the condensers 14 and 23 the gas was cooled to a temperature of 180 to 240° C. In the condenser 31, the gas was cooled to 160° C. approximately.

Figure 3:
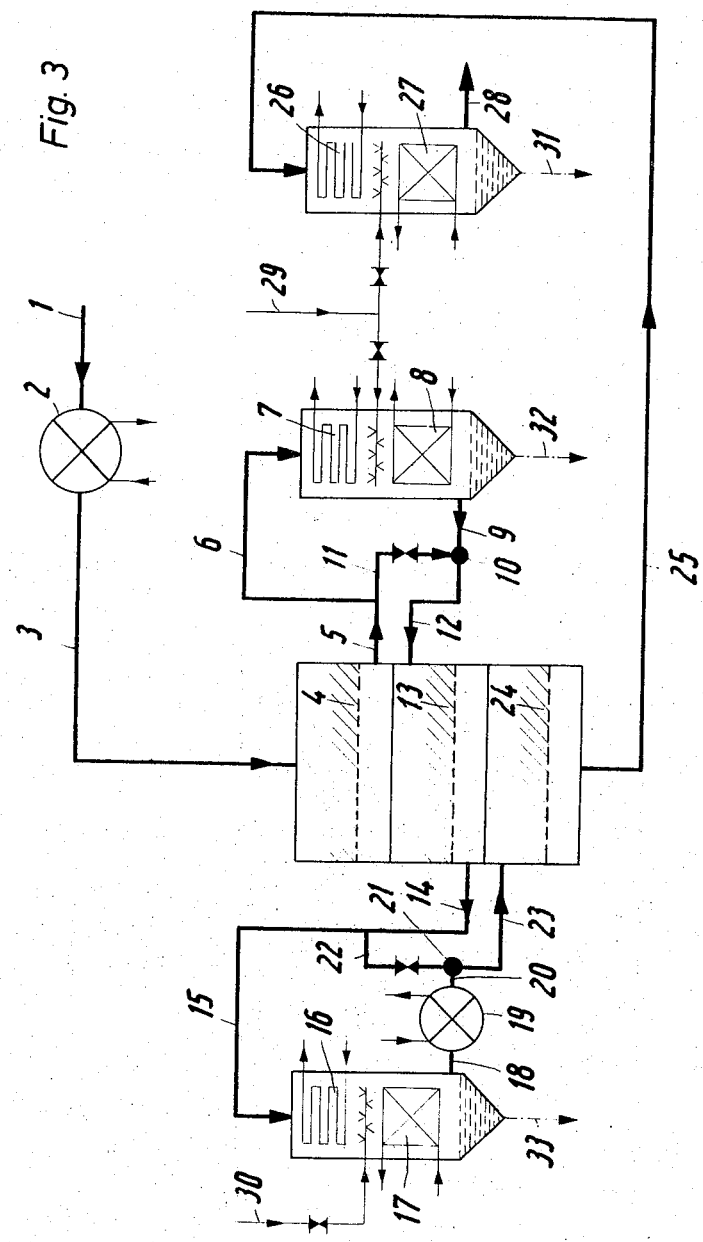
FIG. 3 shows a flow scheme relating to the processing of gases from roasting and a total conversion of about 99.4–99.9%.

Example 3 (FIG. 3)

Purified gases from roasting at a temperature of 50° C. are supplied through conduit 1 into the heat exchanger 2, heated to 430–450° C. and supplied through conduit 3 into the first catalyst tray 4. All gas which has been partly reacted on a catalyst is withdrawn from tray 4 through conduit 5. A partial stream is supplied through conduit 6 to cooler 7, where it is cooled to a temperature above the dew point of the gas then supplied to the condenser 8 where it is cooled to about 180–240° C. withdrawn from the condenser 8 and supplied to the mixing chamber 10 through the conduit 9. The remaining hot gas which has not been subjected to condensation is supplied directly to the mixing chamber 10 through conduit 11. The ratio of the rate at which the partial stream is passed through the condenser and the rate of the remaining gas, which has not been subjected to condensation, is so adjusted that the mixed gas is at the inlet temperature required for the next tray 13. The mixed gas at a temperature of about 420–430° C. is supplied through conduit 12 to the second catalyst tray 13. The gas which has been further reacted on the catalyst in catalyst tray 13 is withdrawn from the latter through conduit 15 to the cooler 16, where it is cooled to a temperature above the dew point of the gas, supplied to the condenser 17, cooled to about 180–240° C., withdrawn through conduit 18 from the condenser 17 and passed into the heat exchanger 19. The reheated gas is supplied to the mixing chamber 21 through conduit 20. The remaining hot gas which has not been subjected to condensation is supplied directly to the mixing chamber 21 through conduit 22. The ratio of the rate of the partial stream which is passed through the condenser 17 and the heat exchanger 19 and the rate of the remaining gas, which is not subjected to condensation, is adjusted so that the mixed gases are at the inlet temperature required for the next tray 24. The gas heated to the optimum inlet temperature is supplied through conduit 23 to the catalyst tray 24. The gas which has been completely reacted on the catalyst is supplied through conduit 25 to the cooler 26, where it is cooled to a temperature above the dew point of the gas and is then supplied to the condenser 27, where the $SO_3$ contained in the gas is condensed. The exhaust gas is removed through conduit 28. The water required for the condensation in the condenser 8, 17, and 27 is introduced through conduits 29 and 30 unless the starting gases contain sufficient moisture. The sulfuric acid is withdrawn through conduits 31, 32 and 33. The acid concentration in 31, 32 and 33 amounted to an average of 96%. Through tubing 6, passed 5500 Nm.$^3$/h. (55%); through tubing 11, 4550 Nm.$^3$/h. (45%). This example too is calculated to yield 100 tons monohydrate per day employing a feed gas of 9% $SO_2$. The tons conversion in the first catalyst bed amounted to 64%. Through tubing 15 passed 7600 Nm.$^3$/h. (80%) and through tubing 22, 1984 Nm.$^3$/h. (20%). The conversion in this instance amounted to 93%. In the coolers 16 and 26, the gas was cooled to 300 to 320° C.

The feed gases contained 584 kg. water per hour. Via tubing 29 and 30, 351 kg. steam per hour were added. From this, 125 kg. per hour went into condenser 8, 162 kg. per hour went into condenser 17, and 64 kg. per hour went into condenser 27.

The gases were cooled to a temperature of 180 to 240° C. in the condenser 8 and 17, and in the condensers 27 they were cooled to approximately 160° C.

Figure 4:
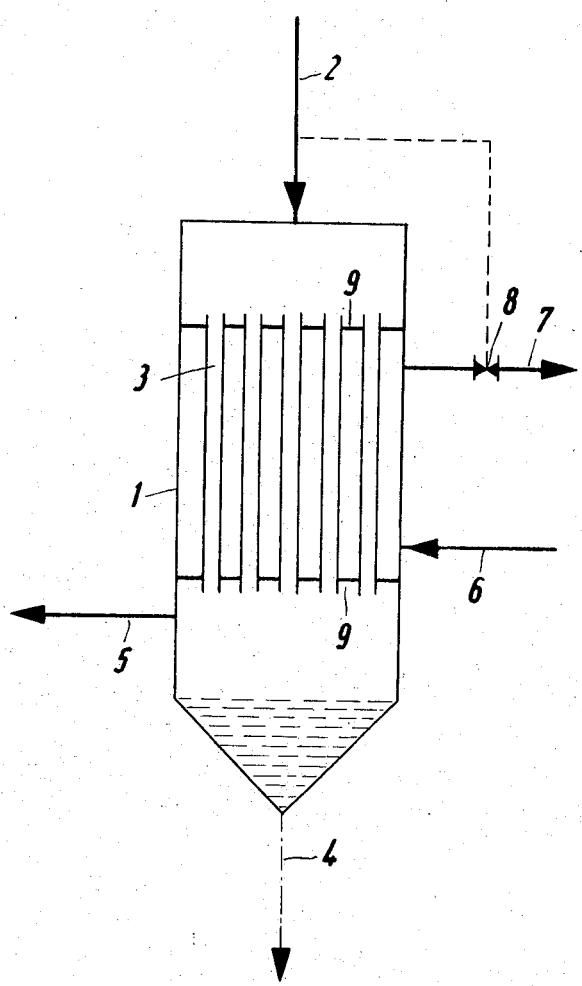
FIG. 4 shows an embodiment of a condenser in which a superatmospheric pressure is maintained on the cold side.

Example 4 (FIG. 4)

With reference to FIG. 4, the gas which contains $SO_3$ is supplied through conduit 2 to the condenser part 1 shown in FIG. 4, where it is cooled and subjected to condensation while flowing in a countercurrent to the cooling fluid flowing around the exchange surfaces 3. The condensed sulfuric acid is withdrawn through conduit 4. The exhaust gas is withdrawn through conduit 5. The cooling fluid is supplied to the condenser 1 through conduit 6 and is withdrawn through conduit 7. An automatic control device 8 is used to maintain the cooling fluid under pressure which is higher than that of the gas in response to the pressure measured in conduit 2. The exchange surfaces 3 are formed by material which cannot be gas-tightly connected to the carrying plates 9 or which renders such connection difficult.

Herein a catalyst "stage" is to be understood as containing one or more trays.

By a closed flow path between two catalyst stages it is meant that all hte withdrawn gas from the first of the two stages which is returned to the catalyst system is returned to the second of the two stages.

What is claimed is:

1. A process of catalytically reacting $SO_2$-containing gas to form $SO_3$ in a catalytic plant, including a plurality of catalyst stages and in which $SO_3$ is condensed between catalyst stages forming sulfuric acid, characterized in that:
   (a) the $SO_2$-containing gas is pumped through the plant with a blower upstream of the first catalyst stage;
   (b) the $SO_3$-containing gas leaving the first of two successive stages is transferred along a closed flow path into the second of said two stages;
   (c) a partial stream amounting to 40–70% by volume of the $SO_3$-containing gas leaving said first stage, is separated from said transferred stream and cooled to a temperature above the dew point of gas, and $SO_3$ is condensed in an indirect heat exchanger from the partial stream by cooling to 180–240° C.;
   (d) said partial stream following said condensing is combined with the balance of said transferred stream and the combined stream is introduced into the second catalyst stage;
   (e) the proportion of the partial stream to said balance of the transferred stream is such that the said combined stream is at the gas inlet temperature for said second stage;
   (f) the conversion of $SO_2$ to $SO_3$ in said stages being in excess of about 98%.

2. Process according to claim 1, and including a third catalyst stage following said first and second stages, and wherein:
   (a) the $SO_3$-containing gas leaving the second stage is transferred along a closed flow path into the third stage;
   (b) a partial stream amounting to about 20–50% by volume of the $SO_3$-containing gas leaving said second stage is separated from the stream transferred from the second to the third stages, and cooled to a temperature above the dew point of the gas, and $SO_3$ is condensed in an indirect heat exchanger from a partial stream by cooling to about 180–240° C;.
   (c) intermediate the second and third stages, said partial stream following said condensing is combined with the balance of the transferred stream and the combined stream is introduced into the third catalyst stage;
   (d) intermediate the second and third catalyst stages, the proportion of the partial stream to the balance of the transferred stream is such that the combined stream is at the gas inlet temperature for the third catalyst stage;
   (e) the conversion of $SO_2$ to $SO_3$ in said stages being in excess of about 98.5%.

3. Process according to claim 1, wherein
   (a) the $SO_3$-containing gas leaving the second stage is transferred along a closed flow path into a third catalyst stage;
   (b) a partial stream is separated from the second stage-third stage transfer stream, and cooled to a temperature above the dew point of the gas, and $SO_3$ is condensed from the partial stream by cooling to about 180–240° C.;
   (c) following said condensing of the second stage-third stage transfer stream, the partial stream is combined with the balance of the second stage-third stage transfer stream and heat is added to the combined stream providing the combined stream at the gas inlet temperature for said third stage;
   (d) the conversion of $SO_2$ to $SO_3$ in said stages being in excess of about 99.4%.

4. Process according to claim 3, wherein the second stage-third stage partial stream is up to about 90% by volume of the second stage-third stage transfer stream.

5. Process according to claim 1, the catalytic plant comprising three catalyst stages.

6. Process according to claim 1, said cooling being effected with a fluid at an elevated temperature.

7. Process according to claim 1 wherein said condensing is effected in a condenser having a cold side for cooling fluid and a hot side for the gas, the pressure on the cold side being maintained above the pressure on the hot side.

8. A process of catalytically reacting $SO_2$-containing gas to form $SO_3$ in a catalytic plant including a plurality of catalyst stages and in which $SO_3$ is condensed between catalysts stages forming sulfuric acid, characterized in that:

(a) the $SO_2$-containing gas is pumped through the plant with a blower upstream of the first catalyst stage;

(b) the $SO_3$-containing gas leaving the first catalyst stage is transferred along a closed flow path into a second catalyst stage;

(c) a partial stream amounting to up to 90% of the transferred stream is separated from the transferred stream and cooled to a temperature above the dew point of the gas, and $SO_3$ is condensed in an indirect heat exchanger from the partial stream by cooling to about 180–240° C.;

(d) said partial stream following said condensing is combined with the balance of said transferred stream and the combined stream is introduced into a second catalyst stage;

(e) the combined heat content of the partial stream following said condensation and said balance of the transferred stream is below that necessary to provide the combined stream at the gas inlet temperature of the second stage, and heat is added to the combined stream providing the combined stream at the gas inlet temperature for the second stage;

(f) the $SO_3$-containing gas leaving the second stage is transferred along a closed flow path into a third catalytic stage;

(g) a partial stream in amount of 20–50% by volume of the second stage-third stage transfer stream is separated from the second stage-third stage transfer stream and cooled to a temperature above the dew point, and $SO_3$ is condensed in an indirect heat exchanger from the second stage-third stage partial stream by cooling to a temperature of about 180–240° C.;

(h) said second stage-third stage partial stream following said condensing is combined with the balance of the second stage-third stage transfer stream and the combined stream is introduced into a third stage;

(i) the proportion of the second stage-third stage partial stream to the balance of the second stage-third stage transfer stream is such that the combined stream thereof is at the gas inlet temperature of the third catalyst stage.

(j) the conversion of $SO_2$ to $SO_3$ in said stages being in excess of about 99.4%.

References Cited
UNITED STATES PATENTS

| | | | |
|---|---|---|---|
| 3,656,900 | 4/1972 | Drechsel et al. | 23—168 |
| 1,036,473 | 8/1912 | Eschellman et al. | 23—176 |
| 1,660,511 | 2/1928 | Jaeger | 23—175 X R |
| 1,789,460 | 1/1931 | Clark | 23—176 |
| 2,278,778 | 4/1942 | Grossman et al. | 23—167 |
| 2,520,454 | 8/1950 | Carter | 23—175 X R |

EDWARD J. MEROS, Primary Examiner

J. COOPER, Assistant Examiner

U.S. Cl. X.R.

423—533